(12) United States Patent
Hong et al.

(10) Patent No.: US 8,164,424 B2
(45) Date of Patent: Apr. 24, 2012

(54) SYSTEM AND METHOD OF INTEGRATED PROCESSING OF ELECTRONIC TAG

(75) Inventors: Bong-Hee Hong, Busan (KR); Ryuan Choi, Busan (KR); Woo-Seok Ryu, Yangsan-Si (KR); Sung-Woo Ahn, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 746 days.

(21) Appl. No.: 12/320,909

(22) Filed: Feb. 9, 2009

(65) Prior Publication Data

US 2009/0212922 A1 Aug. 27, 2009

(30) Foreign Application Priority Data

Feb. 26, 2008 (KR) .................. 10-2008-0017417

(51) Int. Cl.
*H04Q 5/22* (2006.01)
*G08B 25/00* (2006.01)
*H04L 1/18* (2006.01)
(52) U.S. Cl. .................. 340/10.1; 340/10.3; 340/10.4; 340/10.52; 340/298; 714/749
(58) Field of Classification Search .................. 235/436, 235/438, 439; 714/749
See application file for complete search history.

(56) References Cited

U.S. PATENT DOCUMENTS

| 7,692,532 | B2* | 4/2010 | Fischer et al. | 340/10.2 |
| 7,869,889 | B2* | 1/2011 | Flanders et al. | 700/79 |
| 2008/0136599 | A1* | 6/2008 | Sugano et al. | 340/10.1 |
| 2010/0194545 | A1* | 8/2010 | Wong | 340/10.51 |

* cited by examiner

*Primary Examiner* — Benjamin C Lee
*Assistant Examiner* — Omeed Alizada
(74) *Attorney, Agent, or Firm* — Sherr & Vaughn, PLLC

(57) ABSTRACT

A system of electronic tag has developed for integrated processing by utilizing RFID technology, which comprises a reader for collecting information, processor for processing success failure, unsure state of instruction, and a terminal for submitting transaction and receiving the result of transaction to identify. The method for integrated processing of an electronic tag comprising steps of: (A) storing information on the requested transaction and starting the transaction; (B) determining the electronic tag identifying a subject for the transaction with the stored electronic tag and requesting the transaction corresponding to the identified electronic tag to the reader; (C) storing the corresponding electronic tag in an electronic tag list and defining the electronic tag as an unsure state if the unsure state is identified from the requested electronic tag; and (D) reporting on user's terminal if the user requests to terminate the transaction of the electronic tag list corresponding to the defined unsure state.

10 Claims, 4 Drawing Sheets

SYSTEM AND METHOD OF INTEGRATED PROCESSING OF ELECTRONIC TAG

BACKGROUND OF THE INVENTION

1. Field of the Invention

The present invention relates to a system and method for integrated processing of an electronic tag using wireless network. More particularly, an electronic tag is utilized for identifying through Radio Frequency Identification (RFID) technology and securing a writing operation in a storage area of the electronic tag at real time.

2. Description of the Prior Art

RFID technology using an electronic tag is technology of obtaining information through communicating with a subminiature IC chip in a non-contact manner by using a wireless signal and has been widely applied to various industrial fields of electronics, clothes, and foods, in place of an existing optical barcode for obtaining information through a contact manner.

The RFID technology includes an RFID system including an RFID reader for reading and decoding information and an RFID transponder for providing information. The RFID transponder is referred to as an RFID tag or an electronic tag, in which the tag attached to a product includes information on every process of manufacturing, distributing, keeping, and consuming and the information included in the tag is read by the RFID reader through an antenna.

The electronic tag is classified into an active electronic tag having its own electric power, a passive electronic tag without its own electric power, and a semi-active electronic tag in a hybrid form of the active electronic tag and the passive electronic tag, depending on whether or not to have its own electric power. Further, the electronic tag is classified into a read-write type that can be written and read, a Write Once/Read Many (WORM) type that can be written to once, but read from multiple times, and a read-only type that can be only read, depending on the characteristic of the function.

The operation of identifying the electronic tag is as follows. First, if the electronic tag passes by a frequency valid range having identical frequency bandwidth which is formed by an antenna of the RFID reader, the electronic tag senses a signal generated from the RFID reader and transmits information stored in the electronic tag to the RFID reader. Further, the writing operation on the electronic tag is executed through an additional process that the tag is identified through the identifying operation and the RFID reader writes the predetermined information on the electronic tag.

Further, a system of recording information on a physical device employs a transaction processing scheme for a recovery method with respect to system failure such as a stoppage of power supply and media failure such as breakage of the disk. In the system employing such a transaction processing scheme, data related to instructions executed by the transaction is stored in a separate storage device in preparation of failure and if failure occurs, the data is restored to previous data or only a job up to a predetermined time point is completed, so as to provide a consistency between the physical storage device and data.

A transaction processing system can ultimately terminate the corresponding transaction using a commit of authorizing and ensuring modification of the instructions included in the transaction and a rollback of returning to a state where every instruction included in the transaction is not executed. Especially, if a transaction is successfully committed, the transaction processing system ensures it to an application program that the corresponding transaction has properly completed.

However, as RFID technology is recognition technology using radio frequency, it has a few problems in that if radio distortion or radio interference, such as concurrently identifying one or more electronic tags, occurs, the identification ratio is greatly deteriorated. Further, if the electronic tag is attached to a product made of metal materials and liquid, the deterioration of the identification also occurs.

However, the above-mentioned problems occur in the writing operation, as well as the identifying operation. In this respect, if radio interference occurs during the execution of the writing operation with respect to the information on the electronic tag by the reader, the writing work transmitted to the electronic tag may fail to be transferred or the electronic tag fails to receive an appropriate response from the electronic tag. However, the reader cannot discriminate between the above two situations, so as to fail to identify whether the writing operation is properly executed on the electronic tag.

Unlike the typical environment, even though the writing operation has failed due to the interference, the electronic tag corresponding to a storage media does not always exist in an identification area of the reader so that it is impossible to ensure the commit or rollback of the transaction until the electronic tag is identified again in the identification area of the reader, thereby causing more serious problems.

SUMMARY OF THE INVENTION

Accordingly, an object of the present invention has been made to solve the above-mentioned problems occurring in the prior art, and the present invention provides a system and method for integrated processing of an electronic tag, when additional information is desired to be recorded on a product employing the electronic tag by using the RFID technology, which can prevent the situation where the wrong information is written on the product due to radio interference and is identified so that the information on the product is incorrectly determined.

Another object of the present invention is to provide a system and method for integrated processing of an electronic tag, which secures the writing operation on memory of the electronic tag and considers the transaction including one or more of reading and writing operations registered by a user's terminal, in preparation for the situation where a reader cannot identify the state of the electronic tag due to the above-mentioned problems occurring during recording information on the electronic tag through a writing instruction by the reader.

Another object of the present invention is to provide a system and method for integrated processing of an electronic tag which can repeatedly execute the writing operation until a reader receives the result if the reader having executed the writing operation on the electronic tag fails to receive a result, and maintain and manage an electronic tag list having executed the unsure writing operation, even though the user's terminal terminates the transaction, so as to successfully complete the corresponding transaction through executing the writing operation again when the corresponding electronic tag enters an identification area of the reader thereafter.

In accordance with an aspect of the present invention, there is provided a system for integrated processing of an electronic tag, the system including: a reader for identifying an electronic tag so as to collect or write information and as a result, reporting success/failure and an unsure state of an instruction; an electronic tag information processing unit for identifying information on the electronic tag from the reader, providing the reader with information to be processed in a writing instruction, and processing a case where an unsure state instruction is reported from the reader; and a user's terminal for requesting a transaction including at least one of a reading operation or a writing operation to the electronic tag information processing unit and receiving back a result of the request from the electronic tag information processing unit to identify the result.

Preferably, the reader defines a case where the electronic tag disappears or the electronic tag fails to receive a response from the electronic tag for a predetermined time period after transmitting the writing instruction to the electronic tag as an unsure state so as to return the unsure state.

Preferably, the electronic tag information processing unit includes: an electronic tag identification collecting module for obtaining information on the electronic tag from the reader; a collected tag information filtering module for receiving an input of the information on the electronic tag obtained through the electronic tag identification collecting module and determining whether the electronic tag is subjected to the transaction; an electronic tag information recording module for transmitting information to be recorded on the electronic tag to the reader and receiving back a result from the reader; a transaction processing module for executing a series of tag instructions on the electronic tag on a basis of information on the transaction requested from the user's terminal and returning the result of the execution to the user's terminal; a transaction storing module for receiving information on the transaction requested from the user's terminal from the transaction processing module and storing the information; and an unsure electronic tag list including the electronic tag information and transaction information and storing information on the corresponding instruction when unsureness for the tag instructions returns from the reader.

Preferably, if the result transmitted from the reader is determined the unsure state in trying to execute the writing operation on the electronic tag, the electronic tag information recording module tries to execute the writing operation again and receiving the result of the writing operation if the corresponding electronic tag exists within the identification area of the reader, and, if the corresponding electronic tag does not exist within the identification area of the reader, the electronic tag information recording module stores information on the corresponding electronic tag and writing instruction in the unsure electronic tag list and tries to execute the writing operation again when the corresponding electronic tag enters the identification area of the reader.

Preferably, the transaction processing module does not remove the corresponding transaction, but modifies the state of the transaction into a partial commit state if the electronic tags related to the transaction receiving the termination request from the user's terminal are included in the unsure electronic tag list.

Preferably, the transaction processing module executes the instruction again when the electronic tag included in the unsure electronic tag list enters the identification area of the reader again and removes the electronic tag information from the unsure electronic tag list if the result is identified, and modifies the corresponding transaction into a commit state in the transaction storing module if all electronic tags related to the corresponding transaction are not included in the unsure electronic tag list.

In accordance with another aspect of the present invention, there is provided a method for integrated processing of an electronic tag using a system including a reader for identifying an electronic tag so as to collect or write information and as a result, reporting success/failure and an unsure state of an instruction and a user's terminal for requesting a transaction, receiving a result of the requested transaction, and identifying the result, the method including the steps of: (A) storing information on the requested transaction and starting the transaction if the user's terminal requests the transaction information; (B) determining the electronic tag as a subject for the transaction if the electronic tag identified in an identification area of the reader corresponds to the stored electronic tag and requesting the transaction corresponding to the identified electronic tag to the reader; (C) storing the corresponding electronic tag in an electronic tag list and defining the electronic tag as an unsure state if the unsure state is identified from the requested electronic tag; and (D) reporting a partial commit to the user's terminal if the user's terminal requests to terminate the transaction of the electronic tag list corresponding to the defined unsure state.

Preferably, the step of (C) includes the steps of: a first identification of identifying whether or not to receive a result of the unsure state from the reader as a result with respect to the transaction; determining if the electronic tag exists within the identification area of the reader if it is identified that the result of the unsure state is received as a requested transaction result, as a result of the first identification; requesting to execute the transaction again if it is determined that the electronic tag exists within the identification area of the reader as a result of the determination; and storing information on the corresponding electronic tag and transaction in the unsure electronic tag list if it is determined that the electronic tag does not exist within the identification area of the reader as a result of the determination.

Preferably, the method further includes the steps of: a second identification of storing a corresponding result if the result according to success or failure of the requested transaction is received as a result of the first identification and identifying if the stored transaction is a partial commit state; modifying the transaction of the corresponding electronic tag into a completed state if the stored transaction is not a partial commit state as a result of the second identification and repeating the step if there is no request for terminating the transaction; and removing the information on the electronic tag and transaction from the unsure electronic tag list if the stored transaction is a partial commit state as a result of the second identification and removing the transaction information if the information on the corresponding transaction is not left in the unsure electronic tag list.

Preferably, the step of (D) includes the steps of: a third identification of identifying whether the information on the corresponding transaction is included in the unsure electronic tag list if the user's terminal requests to terminate the transaction; removing the transaction information and terminating the transaction if it is identified that the information on the corresponding transaction is not included in the unsure electronic tag list as a result of the third identification; and modifying the information on the corresponding transaction into a partial commit in a corresponding transaction storing module if it is identified that the information on the corresponding transaction is included in the unsure electronic tag list as a result of the third identification and reporting the partial commit to the user's terminal.

DETAILED DESCRIPTION OF THE EXEMPLARY EMBODIMENTS

Figure 1:
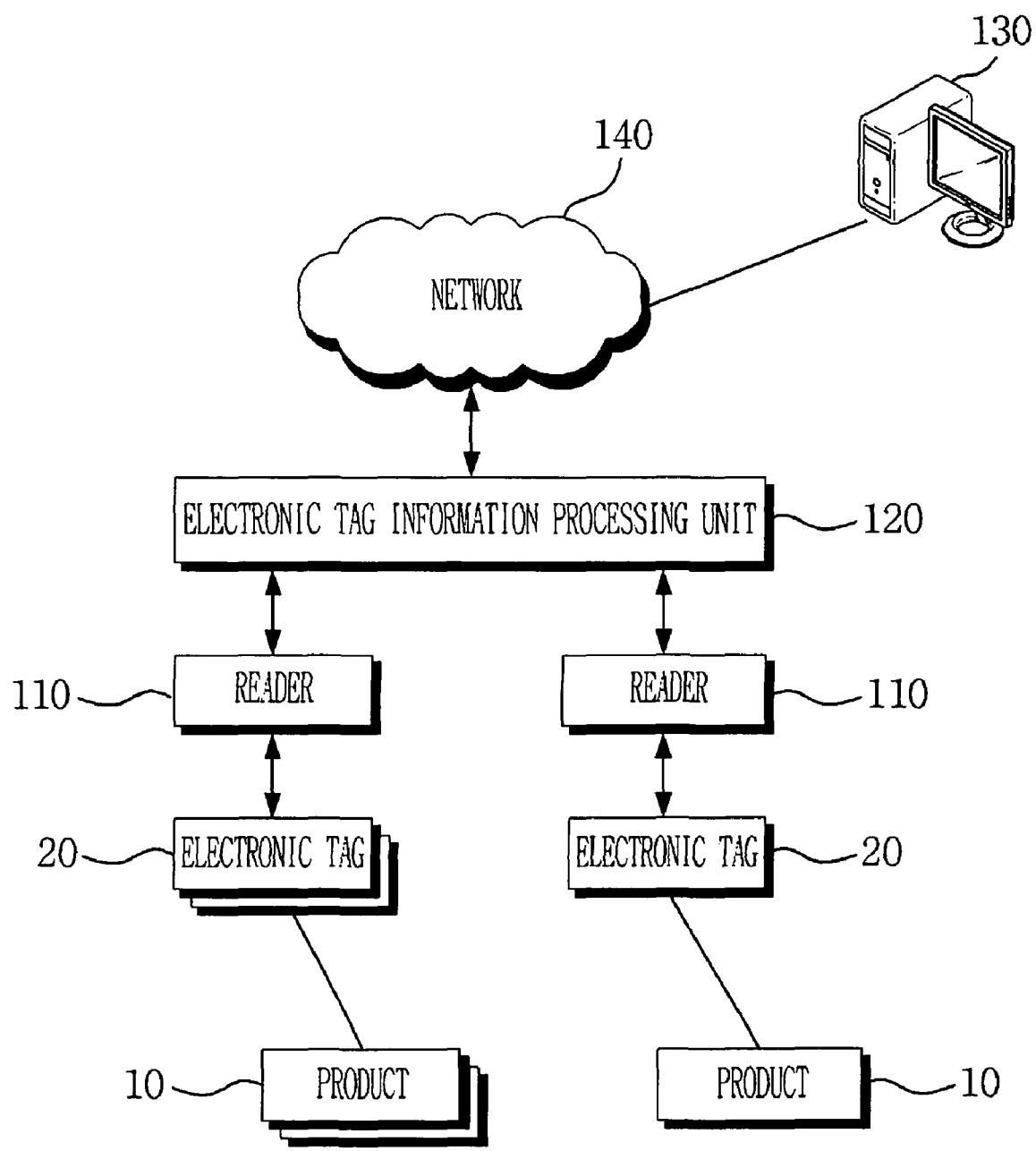
FIG. 1 is a diagram illustrating a system for integrated processing of an electronic tag according to an exemplary embodiment of the present invention.

Hereinafter, an advantage, characteristic, and method for achieving them will become apparent with the reference of the following exemplary embodiments, in conjunction with the accompanying drawings.

The exemplary embodiment of a system and method for integrated processing of an electronic tag will be described with reference to the accompanying drawings. Hereinafter, the exemplary embodiment of the present invention will be described in more detail with reference to the accompanying drawings. Prior to this, the terms or words used in the specification and claims must not be interpreted as a conventional or lexical meaning, but interpreted as a meaning complying to the technical spirit of the present invention pursuant to a principle that the concept of the term can be adequately defined for describing the present invention with the inventor's best. Therefore, the exemplary embodiment described in the specification and the constructions illustrated in the drawings correspond to only the most preferable embodiment, but do not represent all of the technical spirit of the present invention. Accordingly, it should be understood that various equivalents and modifications can substitute them at the time of filing the present invention.

FIG. 1 is a diagram illustrating a system for integrated processing of an electronic tag for securing a writing operation in memory of the electronic tag according to an exemplary embodiment of the present invention.

As illustrated in FIG. 1, the system 100 for integrated processing of an electronic tag includes an electronic tag 20 including tag memory, a reader 110 for identifying the electronic tag 20, writing information on the electronic tag 20 and as a result, reporting success/failure and an unsure state with respect to the writing operation, an electronic tag information processing unit 120 for providing the reader 110 with information to be written on the electronic tag 20 through a writing instruction and, if receiving unsureness as a result of the writing instruction from the reader 110, processing the reported result of unsureness, and a user's terminal 130 requesting a transaction including at least one reading or writing operation to the electronic tag information processing unit 120 and identifying it. Here, the unsure state refers to the state where the reader 110 executes the writing operation on the electronic tag 20, but fails to receive the result of the writing operation from the electronic tag 20, which includes the case where the reader 110 executes the writing instruction in the electronic tag 20 and then the corresponding electronic tag 20 leaves an identification area of the reader 110, a message get lost due to radio interference during the electronic tag 20 responds to the reader 110, or electronic tag information processing unit 120 fails to receive the message transmitted from the reader 110 due to radio interference.

At this time, as is known, the reader 110 executes the reading and writing operations on the electronic tag 20 through a mutual induction scheme, an electromagnetic wave scheme, or the like, so as to execute the reading of the information of the electronic tag 20 and the writing of the information on the electronic tag 20, generate a result of the reading and writing operation, and report the result to the electronic tag information processing unit 120. For reference, the reader 110 can be installed in a fixed place or mounted on a mobile apparatus to be carried by a user or formed in various shapes. In the meantime, the reader 110 includes a reader capable of returning the unsure state to the electronic tag information processing unit 120 or a reader capable of responding to at least one state among the above-mentioned unsure states as the corresponding result.

Further, the electronic tag information processing unit 120 performs the transaction including the reading and writing operation with respect to the electronic tag 20 through communicating with the reader 110. At this time, the transaction includes the operations of managing the electronic tag 20, such as lock and kill, as well as reading information on tag memory stored in the electronic tag 20 or writing the information on the electronic tag 20, and the managing operations can be processed in a similar manner of the writing operation.

Then, the user's terminal 130 provides the electronic tag information processing unit 120 with the information on the transaction in order to execute the operations of reading and writing the information of the electronic tag 20.

In the meantime, the electronic tag information processing unit 120 and the user's terminal 130 are commonly connected to a network 140 capable of transmitting and receiving data therebetween. At this time, the network 140 includes wire/wireless communication network, such as Public Switched Telephone Network (PSTN) or mobile communication network.

Figure 2:
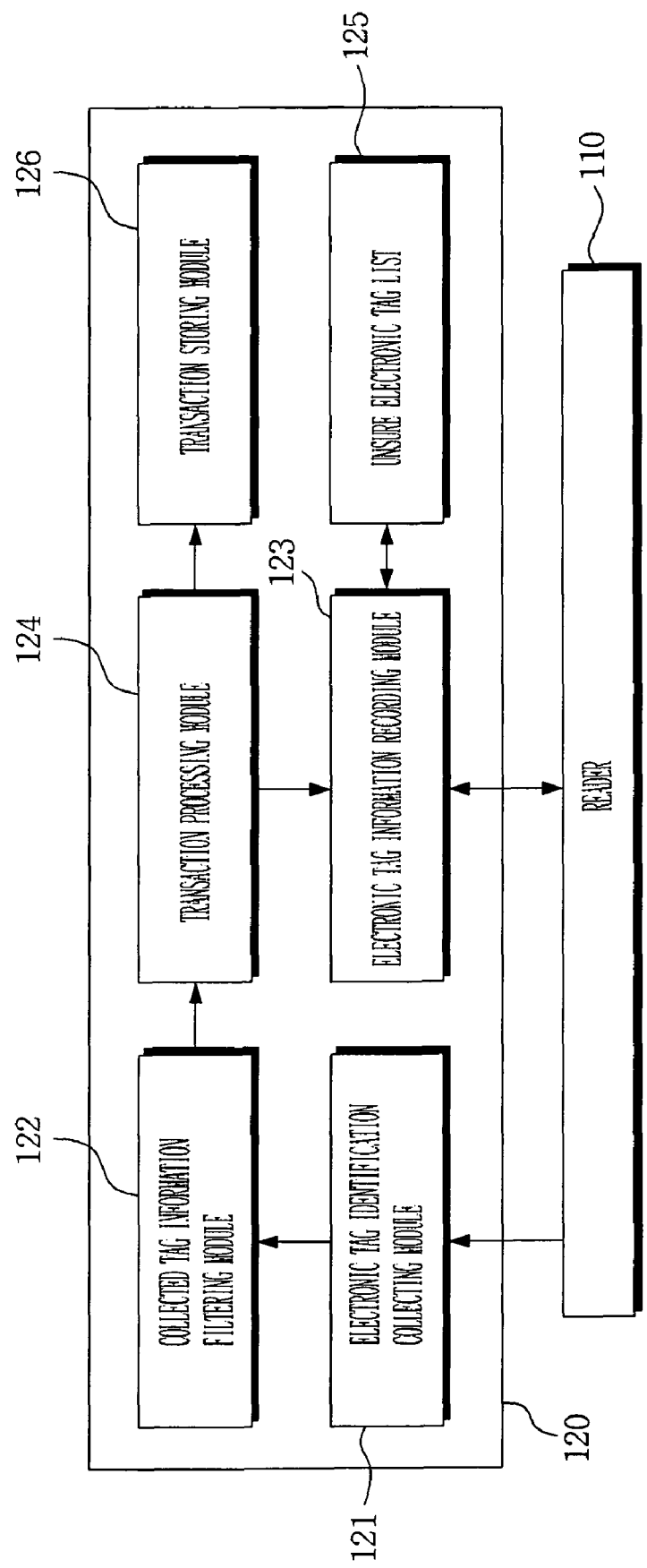
FIG. 2 is a diagram specifically illustrating an electronic tag information processing unit of FIG. 1.

FIG. 2 is a diagram specifically illustrating the construction of the electronic tag information processing unit 120 shown in FIG. 1. The electronic tag information processing unit 120 includes an electronic tag identification collecting module 121, a collected tag information filtering module 122, an electronic tag information recording module 123, a transaction processing module 124, an unsure electronic tag list 25, and a transaction storing module 126.

The electronic tag identification collecting module 121 receives input of the electronic tag 20 information from the reader 110 and collects the electronic tag 20 information, the collected tag information filtering module 122 receives information on the electronic tag from the electronic tag identification collecting module 121, identifies if the electronic tag corresponds to the transaction registered by the user's terminal 130, and transfers the electronic tag 20 information to the transaction processing module 124 if the electronic tag 20 is subjected to the transaction.

Then, if the operation of the transaction is the writing, the transaction processing module 124 transfers the writing instruction to the reader 110 through the electronic tag information recording module 123 for recording the information on the electronic tag 20.

Then, the electronic tag information recording module 123 transmits the information to be recorded on the electronic tag 20 to the reader 110 and waits for a response, such as success, failure, or unsureness, from the reader 110. At this time, in trying to execute the writing operation on the electronic tag 20, if the result received from the reader 110 is determined as the unsure state, the electronic tag information recording module 123 tries to execute the writing operation again so as to receive the result of the writing operation if the corresponding electronic tag 20 exists within the identification area of the reader 110, and if the corresponding electronic tag 20 does not exist within the identification area of the reader 110, the electronic tag information recording module 123 stores the information on the corresponding electronic tag and writing instruction in the unsure electronic tag list 125 and tries the writing operation when the corresponding electronic tag enters again the identification area of the reader.

The transaction processing module 124 performs a series of operations related to the transaction, including storing the information on the corresponding transaction in the transaction storing module 126 when receiving a request for starting the transaction from the user's terminal 130, processing the reading or writing operation defined by the activated transaction with respect to the identified electronic tag, terminating the transaction if receiving a request for terminating the transaction from the user's terminal 130 and modifying or removing the information on the corresponding transaction storing module. At this time, if the transaction receiving the termination request is included in the unsure electronic tag list 125, the transaction processing module 124 does not remove the corresponding transaction, but modifies into a partial commit state.

Further, when the electronic tag 20 included in the unsure electronic tag list 125 enters the identification area of the reader 110 later, the transaction processing module 124 executes the instruction again and if the result is identified, removes the electronic tag 20 information from the unsure electronic tag list 125. As a result, if the partially committed transaction is not included in the unsure electronic tag list 125, the transaction processing module 124 removes the corresponding transaction from the transaction storing module 126.

That is, in requesting to terminate the transaction by the user's terminal, if the electronic tags 20 related to the corresponding transaction are included in the unsure electronic tag list 125, the transaction processing module 124 reports the operation for the partial electronic tag 20 related to the corresponding transaction being left (partial commit) to the user's terminal and terminates the transaction.

Further, even though the transaction terminates the work, the transaction processing module 124 tries to execute the writing operation with respect to the electronic tags 20 included in the unsure electronic tag list 125 when the corresponding electronic tag 20 enters within the identification area of the reader 110. If the transaction processing module 124 successfully completes the writing operation, it removes the corresponding electronic tag 20 information from the unsure electronic tag list 125 and commits the transaction that does not include the corresponding electronic tag 20 included in the unsure electronic tag list 125 any longer.

The unsure electronic tag list 125 maintains an electronic tag list having the unsure writing state stored by the transaction processing module 124 and information on the transaction that had tried to execute the corresponding writing instruction.

Also, the transaction storing module 126 receives information on the transaction including the reading and writing instructions with respect to the electronic tag 20 requested by the user's terminal 130 from the transaction processing module 124 so as to store the information.

Hereinafter, the operation of the system for integrated processing of the electronic tag constructed as above according to the present invention will be described in detail with reference to the accompanying drawings.

Figure 3:
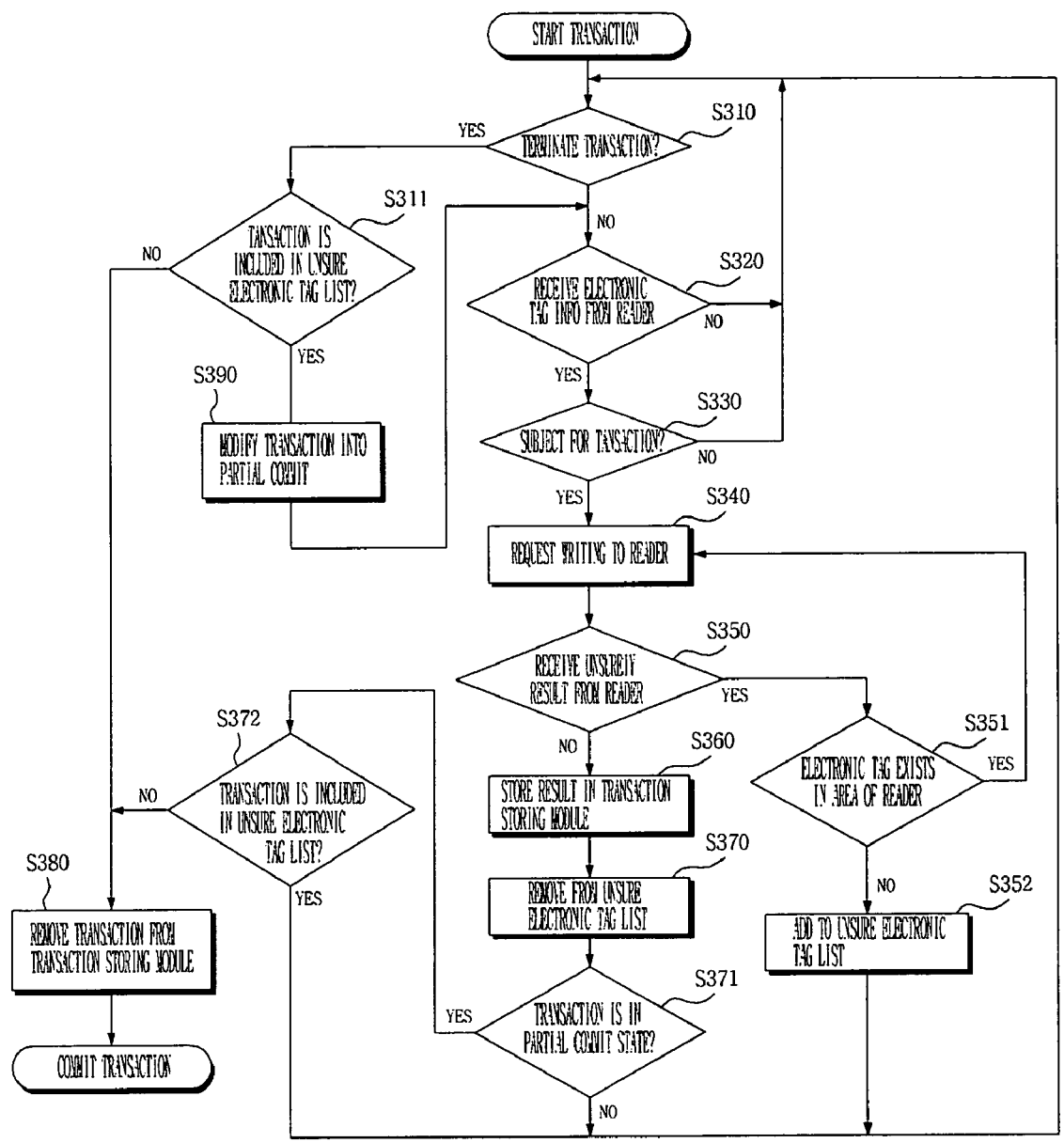
FIG. 3 is a flowchart illustrating a method for integrated processing of an electronic tag according to an exemplary embodiment of the present invention.

FIG. 3 is a flowchart illustrating a method for integrated processing of the electronic tag in order to stably execute the writing operation with respect to the information on the electronic tag according to an exemplary embodiment of the present invention. In description, like reference symbols in various drawings indicate like elements.

Referring to FIG. 3, if the user's terminal 130 requests the transaction information, such as the reading, writing, or the like, to the electronic tag information processing unit 120, the electronic tag information processing unit 120 receiving the request stores the corresponding transaction information in the transaction storing module 126 and starts the transaction.

Next, the transaction processing module 124 receives the electronic tag information from the reader 110 through the electronic tag identification collecting module 121 S320. If the electronic tag 20 identified in the identification area of the reader 110 corresponds to the electronic tag stored in the unsure electronic tag list 125 or the transaction storing module 126, the transaction processing module 124 determines the corresponding electronic tag as a subject for the transaction S330 and requests the writing instruction to the reader 110 through the electronic tag information recording module 123 S340.

Then, the transaction processing module 124 performs the first identification that identifies whether or not to receive the unsure result as the result with respect to the writing instruction from the reader 110 through the electronic tag information recording module 123 S350.

As a result of the first identification S350, if the transaction processing module 124 receives a success or failure result, not the unsure result, as the result from the writing instruction, the transaction processing module 124 stores the corresponding result in the transaction storing module 126 and removes the corresponding electronic tag 20 information and the transaction information from the unsure electronic tag list 125 S370, and performs the second identification that identifies whether or not the stored transaction is in the partial commit state S371.

Further, as a result of the first identification S350, if the transaction processing module 124 receives the result of unsureness as the result from the writing instruction, the transaction processing module 124 identifies if the electronic tag exists within the identification area of the reader 110 for executing the writing instruction again S351 and requests the electronic tag information recording module 123 to perform the writing instruction again if the electronic tag exists within the identification area of the reader 110, and adds the electronic tag to the unsure electronic tag list 125 if the electronic tag does not exist within the identification area of the reader 110 S352.

In the meantime, as the result of the second identification S371, if the stored transaction is not the partial commit state, the writing process with respect to the corresponding electronic tag is modified into the completed state, and if there is no request for terminating the transaction S310, the transaction processing module 124 repeatedly receives the electronic tag S320 so as to repeat the above steps.

Further, as the result of the second identification S371, if the stored transaction is the partial commit state, the transaction processing module 124 identifies if the information on the corresponding transaction is still left in the unsure electronic tag list 125 S372. As a result of the identification S372, if the information on the corresponding transaction is not left in the unsure electronic tag list 125, the transaction processing module 124 removes the transaction information from the transaction storing module 126 S380.

Next, if the user's terminal 130 requests to terminate the transaction, the transaction processing module 124 identifies whether the transaction is terminated or not S310, and performs the third identification that identifies if the information on the transaction is included in the unsure electronic tag list 125 S311.

As a result of the third identification S311, if the information on the corresponding transaction is not included in the unsure electronic tag list 125, the transaction processing module 124 removes the transaction information from the transaction storing module 126 and terminates the transaction S380.

Further, as a result of the third identification S311, if the information on the corresponding transaction is included in the unsure electronic tag list 125, the transaction processing module 124 modifies the corresponding transaction information into the partial commit in the corresponding transaction storing module 126 and reports the partial commit S390 to the user's terminal 130. At this time, because the corresponding transaction is in the partial commit, the electronic tag information is received S320 so that the collected tag information filtering module 122 can determine the subject for the transaction S330. Here, the subject for the transaction corresponds to only the electronic tag included in the unsure electronic tag list 125.

Figure 4:
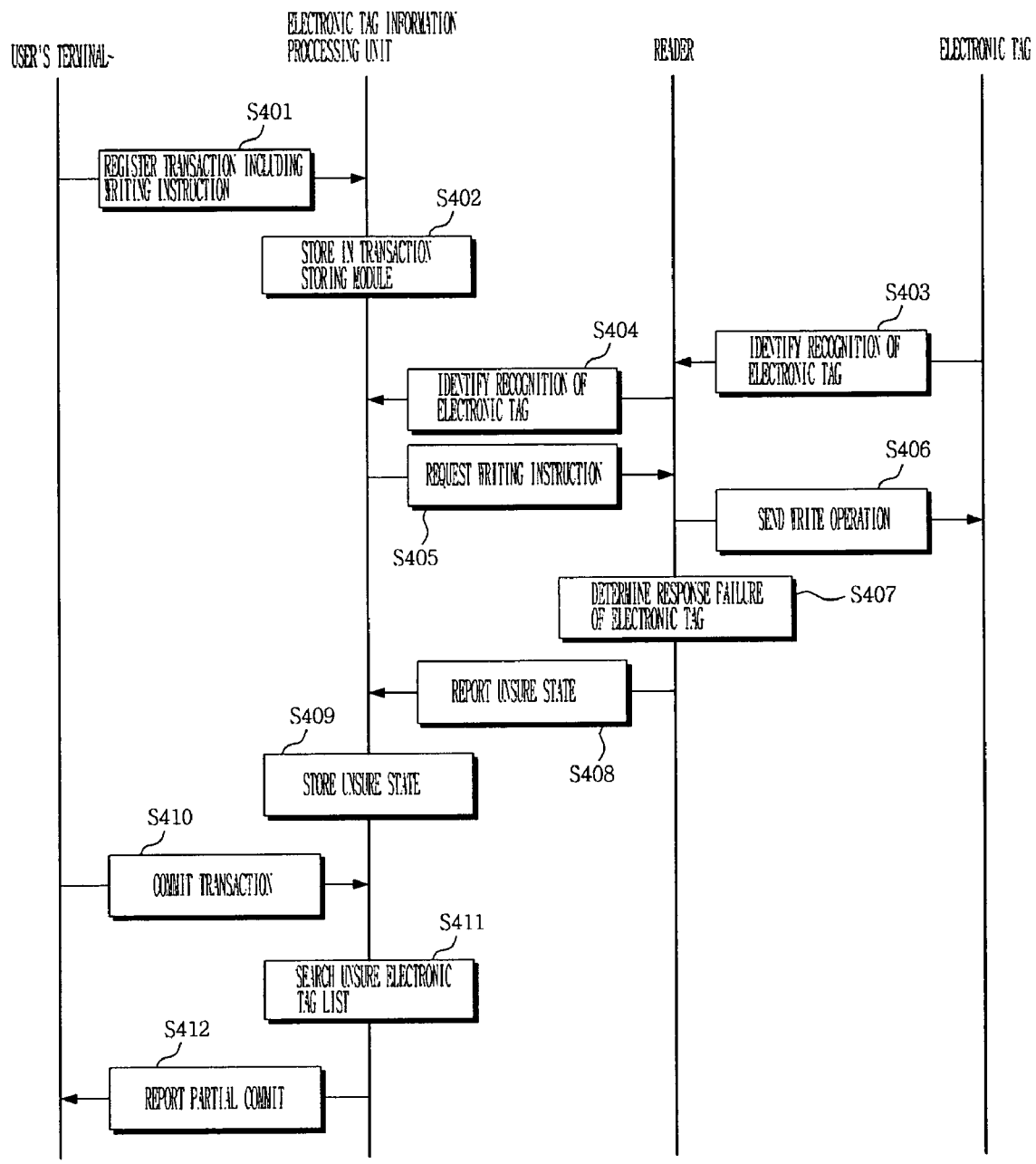
FIG. 4 is a flowchart illustrating the case where an unsure state occurs in a method for integrated processing of an electronic tag according to an exemplary embodiment of the present invention.

FIG. 4 is a flowchart illustrating the case where the unsure state occurs from the electronic tag during recording the information on the electronic tag according to an exemplary embodiment of the present invention.

Referring to FIG. 4, if the user's terminal 130 submits the transaction into the electronic tag processing unit 120 S401, the processing unit 120 of electronic tag information processes the corresponding transaction information in the transaction storing module 126 S402.

Subsequently, if the electronic tag 20 is identified in the identification area of the reader 110 S403, the reader 110 transmits the information on the corresponding electronic tag 20 to the electronic tag information processing unit 120 S404.

The electronic tag information processing unit 120 requests the reader 110 to record the information on the corresponding electronic tag 20 if the identified electronic tag 20 is determined to be a subject for the transaction S405.

The reader 110 receives the writing instruction from the electronic tag information processing unit 120 and executes the writing instruction on the electronic tag S406. At this time, if there is no response from the electronic tag 20 or it is identified that the electronic tag disappears S407, the reader 110 reports the unsure state to the electronic tag information processing unit 120 S408.

If the electronic tag information processing unit 120 receives the report of the unsure state from the reader 110, the electronic tag information processing unit 120 stores the corresponding information in the unsure electronic tag list 125 S409.

Next, the electronic tag information processing unit 120 receives the request for terminating the transaction from the user's terminal 130 S410, the electronic tag information processing unit 120 searches the unsure electronic tag list 125 S411 and reports the partial commit to the user's terminal if it is determined that the corresponding transaction is left S412.

Therefore, the system and method for integrated processing of the electronic tag according to the present invention has the following advantages.

First, when the additional information is desired to be recorded on the product that uses the electronic tag by using the RFID technology, the present invention can prevent the situation where the wrong information written on the product is identified so that the information on the product is incorrectly determined. That is, the present invention has an advantage of preventing the problem caused by the incorrectly recorded information in the product delivery using location information stored in the electronic tag and in the product sale using price information stored in the electronic tag.

Second, when the information is desired to be repeatedly written on the electronic tag using a conveyor belt, or the like, in an automatic logistics environment system, the present invention can report the unsure state, as well as the success or failure with respect to the writing instruction, in order for the user's terminal to take an appropriate action with respect to the writing state of the electronic tag. Therefore, the present invention can increase the compatibility through the retry when the writing operation has failed due to radio interference, except for failure due to pure defect of the electronic tag.

Through the above description, it will be understood by those skilled in the art that various changes and modifications can be made thereto without departing from the technical spirit and scope of the present invention. Therefore, the embodiment described above is only for example in every aspect, and is not limited thereto.

What is claimed is:

1. A system for integrated processing of an electronic tag comprising:
   a reader for identifying an electronic tag so as to collect or write information to the tag and as a result, reporting success/failure and an unsure state of an instruction for collecting or writing information to the tag,
   an electronic tag information processing unit connected to the reader for identifying information on the electronic tag from the reader, providing the reader with information to be processed in a writing instruction, and processing a case where an unsure state instruction is reported from the reader, and
   a user's terminal sending a request for requesting a transaction having at least one of a reading or a writing operation to the processing unit of electronic tag information and receiving a result of the request from the electronic tag information processing unit to identify the result,
   wherein the unsure state comprises any one from the cases where the corresponding electronic tag leaves an identification area of the reader after the reader transmits the writing instruction to the electronic tag, a message gets lost due to radio interference during the electronic tag responds to the reader, the reader fails to receive a message transmitted from the reader due to radio interference, and where the electronic tag disappears or the reader fails to receive a response from the electronic tag for a predetermined time period after transmitting the writing instructions to the electronic tag,
   wherein, if the state result reported from the reader is determined the unsure state in trying to execute the writing operation on the electronic tag, an electronic tag information recording module connected to the reader tries to execute the writing operation through the reader again and receiving the state result of the writing operation if the corresponding electronic tag exists within the identification area of the reader, and, if the corresponding electronic tag does not exist within the identification area of the reader, an electronic tag information recording module stores information on the corresponding electronic tag and writing instruction in the unsure electronic tag list and tries to execute the writing operation again when the corresponding electronic tag enters the identification area of the reader.

2. The system as claimed in claim 1, wherein the transaction comprises operations of reading tag memory information stored in the electronic tag or writing information on the electronic tag and an operation of managing the electronic tag.

3. The system as claimed in claim 1, wherein the electronic tag information processing unit and the user's terminal are commonly connected to a wire/wireless communication network that can transmit and receive data between the electronic tag information processing unit and the user's terminal.

4. The system as claimed in claim 1, wherein the electronic tag information processing unit comprises:
   an electronic tag identification collecting module for obtaining information on the electronic tag from the reader,
   a collected tag information filtering module for receiving an input of the information on the electronic tag obtained through the electronic tag identification collecting module and determining whether the electronic tag is subjected to the transaction,
   said electronic tag information recording module for transmitting information to be recorded on the electronic tag to the reader and receiving back state result from the reader,
   a transaction processing module for executing a series of tag instructions on the electronic tag on a basis of information on the transaction requested from the user's terminal and returning the result of the execution to the user's terminal,
   a transaction storing module for receiving information on the transaction requested from the user's terminal from the transaction processing module and storing the information, and
   wherein unsure electronic tag list includes the electronic tag information, transaction information and storing information on the corresponding instruction when unsureness for the tag instructions return from the reader.

5. The system as claimed in claim 4, wherein the transaction processing module does not remove the corresponding transaction, but modifies the state of the transaction into a partial commit state if the electronic tag related to the transaction receiving a termination request from the user's terminal are included in the unsure electronic tag list,
   wherein the partial commit state is characterized by requesting to terminate the transaction from the user's terminal, and if the electronic tag related to the corresponding transaction is included in the unsure electronic tag list, the transaction processing module connected to the reader modifies the state of the transaction into a partial commit state and terminates the transaction, and when the electronic tag enters within the identification area of the reader, the transaction processing module executes the instruction again and removes the electronic tag information from the unsure electronic tag list if the transaction processing module successfully completes the writing operation.

6. The system as claimed in claim 5, wherein the transaction processing module
executes the instruction again when the electronic tag included in the unsure electronic tag list enters the identification area of the reader again and removes the electronic tag information from the unsure electronic tag list if the result is identified, and modifies the corresponding transaction into a commit state in the transaction storing module if the electronic tag related to the corresponding transaction is not included in the unsure electronic tag list,
   wherein the commit state is characterized by following the partial commit state wherein the transaction processing module successfully completes the writing operation, the transaction processing module removes the corresponding electronic tag information from the unsure electronic tag list and modifies the corresponding transaction into said commit state, marking the successful completion.

7. A method for integrated processing of an electronic tag using a system comprising a reader for identifying an electronic tag so as to collect or write information to the tag and as a result, reporting success/failure and an unsure state of an instruction and a user's terminal sending a request for requesting a transaction, receiving a result of the requested transaction, and identifying the result, the method comprising the steps of:
   (A) storing information on the requested transaction and starting the transaction if the
user's terminal requests the transaction information,
   (B) determining the electronic tag as a subject for the transaction if the electronic tag identified in an identification area of the reader corresponds to the stored electronic tag and requesting the transaction corresponding to the identified electronic tag to the reader,
   (C) storing the corresponding electronic tag in an electronic tag list and defining the electronic tag as an unsure state if the unsure state is identified from the requested electronic tag, and
   (D) reporting a partial commit state to the user's terminal if the user's terminal requests to terminate the transaction of the electronic tag list corresponding to the defined unsure state,
   wherein the partial commit state is characterized by requesting to terminate the transaction from the user's terminal, and if the electronic tag related to the corresponding transaction is included in the unsure electronic tag list, the transaction processing module connected to the reader modifies the state of the transaction into a partial commit state and terminates the transaction, and when the electronic tag enters within the identification area of the reader, the transaction processing module executes the instruction again and removes the electronic tag information from the unsure electronic tag list if the transaction processing module successfully completes the writing operation,
   wherein the unsure state comprises any one from the cases where the corresponding electronic tag leaves an identification area of the reader after the reader transmits the writing instruction to the electronic tag, a message gets lost due to radio interference during the electronic tag responds to the reader, the reader fails to receive a message transmitted from the reader due to radio interference, and where the electronic tag disappears or the reader fails to receive a response from the electronic tag for a predetermined time period after transmitting the writing instructions to the electronic tag.

8. The method as claimed in claim 7, wherein the step of (C) comprises the steps of:
   a first identification of identifying whether or not to receive a result of the unsure state from the reader as a result with respect to the transaction,
   determining if the electronic tag exists within the identification area of the reader if it is identified that the result of the unsure state is received as a requested transaction result, as a result of the first identification,
   requesting to execute the transaction again if it is determined that the electronic tag exists within the identification area of the reader as a result of the determination, and
   storing information on the corresponding electronic tag and transaction in the unsure electronic tag list if it is determined that the electronic tag does not exist within the identification area of the reader as a result of the determination.

9. The method as claimed in claim 8, further comprising the steps of:

a second identification of storing a corresponding result if the result according to success or failure of the requested transaction is received as a result of the first identification and identifying if the stored transaction is a partial commit state, modifying the writing process of the corresponding electronic tag into a complete state if the stored transaction is not a partial commit state as a result of the second identification and repeatedly receives the electronic tag so as to repeat the above steps if there is no request for terminating the transaction, and removing the information on the electronic tag and transaction from the unsure electronic tag list if the stored transaction is a partial commit state as a result of the second identification and removing the transaction information if the information on the corresponding transaction is not left in the unsure electronic tag list.

10. The method as claimed in claim 7, wherein the step of (D) comprises the steps of:

a third identification of identifying whether the information on the corresponding transaction is included in the unsure electronic tag list if the user's terminal requests to terminate the transaction, removing the transaction information and terminating the transaction if it is identified that the information on the corresponding transaction is not included in the unsure electronic tag list as a result of the third identification, and modifying the information on the corresponding transaction into a partial commit in a corresponding transaction storing module if it is identified that the information on the corresponding transaction is included in the unsure electronic tag list as a result of the third identification and reporting the partial commit to the user's terminal.

* * * * *